United States Patent
Baltas et al.

(10) Patent No.: US 8,256,225 B2
(45) Date of Patent: Sep. 4, 2012

(54) GAS TURBINE ENGINE WITH A VARIABLE EXIT AREA FAN NOZZLE, NACELLE ASSEMBLY OF SUCH A ENGINE, AND CORRESPONDING OPERATING METHOD

(75) Inventors: Constantine Baltas, Manchester, CT (US); Joseph R. Hauser, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 823 days.

(21) Appl. No.: 12/373,752

(22) PCT Filed: Oct. 12, 2006

(86) PCT No.: PCT/US2006/039989
§ 371 (c)(1),
(2), (4) Date: Jan. 14, 2009

(87) PCT Pub. No.: WO2008/045071
PCT Pub. Date: Apr. 17, 2008

(65) Prior Publication Data
US 2010/0008764 A1 Jan. 14, 2010

(51) Int. Cl.
*F02K 1/00* (2006.01)
(52) U.S. Cl. ....... 60/771; 60/226.3; 60/226.2; 60/226.1; 239/265.19
(58) Field of Classification Search .......... 60/226.1, 60/262, 770, 771, 242, 226.3, 226.2; 239/265.31, 239/265.19
See application file for complete search history.

(56) References Cited

U.S. PATENT DOCUMENTS

| 3,484,847 | A | * | 12/1969 | Poole | 60/226.2 |
| 3,575,259 | A | * | 4/1971 | Wilkinson | 181/214 |
| 3,747,341 | A | * | 7/1973 | Davis | 60/226.2 |
| 3,809,490 | A | * | 5/1974 | Harner | 415/28 |
| 3,922,852 | A | * | 12/1975 | Drabek | 60/226.1 |
| 3,936,226 | A | * | 2/1976 | Harner et al. | 416/28 |
| 3,994,128 | A | * | 11/1976 | Griswold et al. | 60/226.1 |
| 4,086,761 | A | | 5/1978 | Schaut et al. | |
| 5,136,840 | A | * | 8/1992 | Nash | 60/226.3 |
| 5,197,693 | A | * | 3/1993 | Remlaoui | 244/110 B |
| 5,228,641 | A | * | 7/1993 | Remlaoui | 244/110 B |
| 5,315,821 | A | * | 5/1994 | Dunbar et al. | 60/226.1 |
| 5,507,143 | A | * | 4/1996 | Luttgeharm et al. | 60/226.2 |

(Continued)

FOREIGN PATENT DOCUMENTS

GB 750623 A 6/1956
(Continued)

OTHER PUBLICATIONS

Search Report and Written Opinion mailed on Jun. 5, 2007 for PCT/US2006/039989.
Notification of Transmittal of International Preliminary Report on Patentability, mailed Nov. 4, 2011, PCT/US06/39989.

*Primary Examiner* — William H Rodriguez
(74) *Attorney, Agent, or Firm* — Carlson Gaskey & Olds PC

(57) ABSTRACT

A turbofan engine includes a fan variable area nozzle having a multiple of vents through a fan nacelle and a sleeve system movable relative to the vents by an actuator system. The fan variable area nozzle changes the effective area of the fan nozzle exit area to permit efficient operation at predefined pressure ratios. The vents include a grid structure which directs and smoothes the airflow therethrough as well as to reduce noise generation.

15 Claims, 3 Drawing Sheets

U.S. PATENT DOCUMENTS

| | | | |
|---|---|---|---|
| 5,694,767 A * | 12/1997 | Vdoviak et al. | 60/226.3 |
| 5,722,231 A * | 3/1998 | Porte | 60/226.2 |
| 6,021,637 A * | 2/2000 | Scavo | 60/262 |
| 6,434,927 B1 * | 8/2002 | Stretton | 60/226.2 |
| 6,557,338 B2 * | 5/2003 | Holme et al. | 60/226.2 |
| 6,968,675 B2 * | 11/2005 | Ramlaoui et al. | 60/226.2 |
| 7,000,378 B2 * | 2/2006 | Birch et al. | 60/226.1 |
| 7,966,826 B2 * | 6/2011 | Alkislar et al. | 60/770 |
| 7,966,827 B2 * | 6/2011 | Alletzhauser | 60/770 |
| 8,006,479 B2 * | 8/2011 | Stern | 60/226.2 |

FOREIGN PATENT DOCUMENTS

| | | |
|---|---|---|
| GB | 802123 A | 10/1958 |
| GB | 835134 A | 5/1960 |
| GB | 1119608 A | 7/1968 |
| GB | 1291490 A | 10/1972 |
| GB | 1365491 A | 9/1974 |
| GB | 2372779 A * | 4/2002 |

* cited by examiner

GAS TURBINE ENGINE WITH A VARIABLE EXIT AREA FAN NOZZLE, NACELLE ASSEMBLY OF SUCH A ENGINE, AND CORRESPONDING OPERATING METHOD

BACKGROUND OF THE INVENTION

The present invention relates to a gas turbine engine, and more particularly to a turbofan engine having a fan variable area nozzle which selectively opens vents through a fan nacelle to change a bypass flow path area thereof.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle for a gas turbine engine.

SUMMARY OF THE INVENTION

A turbofan engine according to the present invention includes a fan variable area nozzle having a multiple of vents through a fan nacelle and a sleeve movable relative the vents by an actuator system. The vents when exposed by movement of the sleeve changes the effective area of the fan nozzle exit area and permits efficient operation at predefined flight conditions. The fan variable area nozzle is closed to define a nominal the fan nozzle exit area and is opened for other flight conditions such as landing and takeoff.

The vents include a grid structure which directs and smoothes the airflow therethrough as well as reduce noise generation by introducing randomness in the flow stream which breaks the otherwise discrete vertical structures to minimize edge tones.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
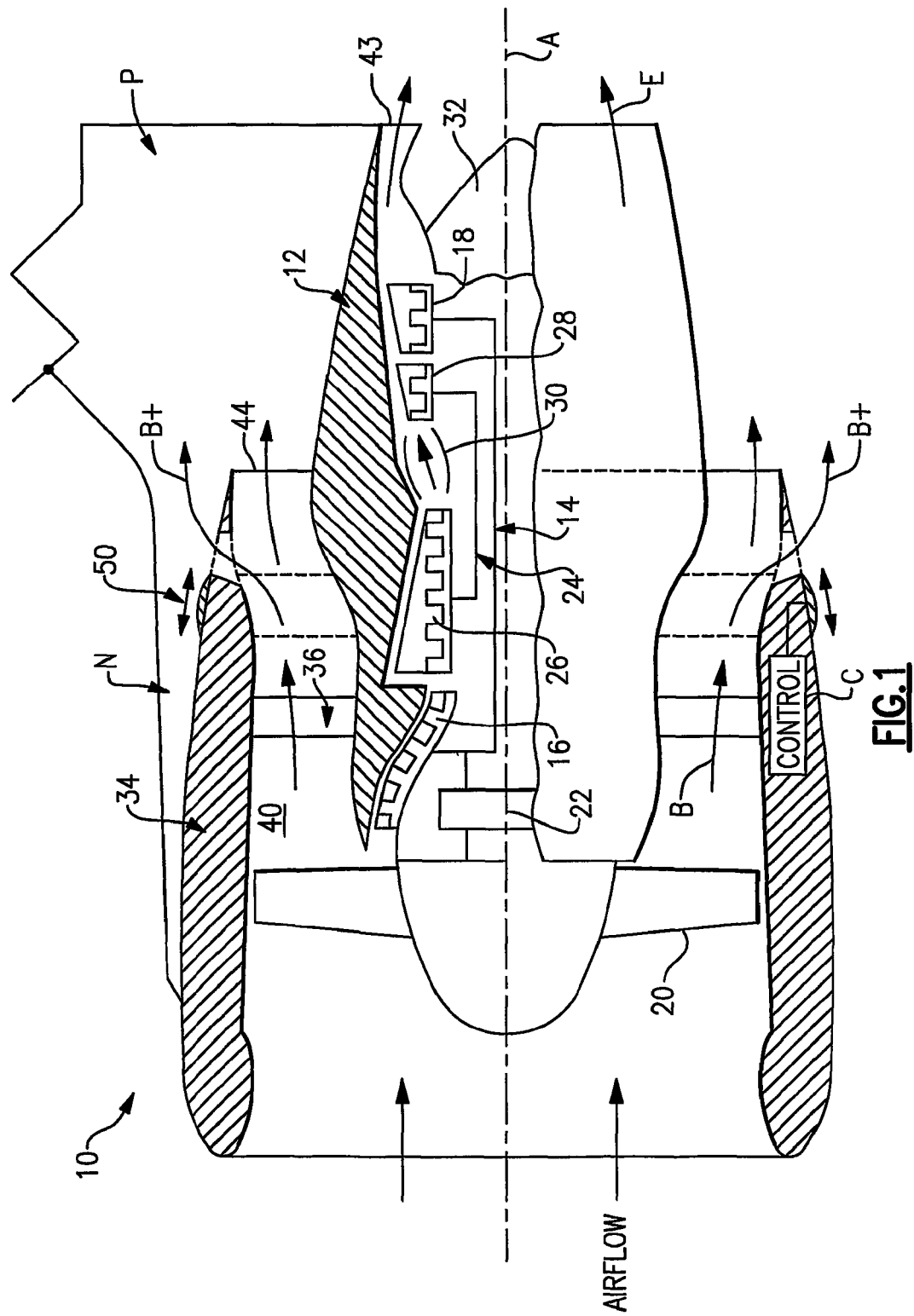
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than ten (10), the turbofan diameter is significantly larger than that of the low pressure compressor 16, and the low pressure turbine 18 has a pressure ratio that is greater than 5. The gear train 22 is preferably an epicycle gear train such as a planetary gear system or other gear system with a gear reduction ratio of greater than 2.5. It should be understood, however, that the above parameters are only exemplary of a preferred geared turbofan engine and that the present invention is likewise applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and is discharged from the engine 10 through a fan variable area nozzle (FVAN) 42 which defines a nozzle exit area 44 between the fan nacelle 34 and the core nacelle 12 adjacent a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The FVAN 42 preferably includes a sleeve system 50 movably mounted to the fan nacelle 34 to effectively vary the area of the fan nozzle exit area 44 to selectively adjust the pressure ratio of the bypass flow B in response to a controller C.

A significant amount of thrust is provided by the bypass flow B due to the high bypass ratio. The fan section 20 of the engine 10 is preferably designed for a particular flight condition—typically cruise at 0.8M and 35,000 feet. As the fan section 20 are efficiently designed at a particular fixed stagger angle for an efficient cruise condition, the sleeve system 50 is operated to effectively vary the fan nozzle exit area 44 to adjust fan bypass air flow such that the angle of attack or incidence on the fan blades is maintained close to the design incidence for efficient engine operation at other flight conditions, such as landing and takeoff thus providing optimized engine operation over a range of flight conditions with respect to performance and other operational parameters such as noise levels. The sleeve system 50 preferably provides an approximately 20% (twenty percent) change in area of the fan exit nozzle area 44. It should be understood that other arrangements as well as essentially infinite intermediate positions are likewise usable with the present invention.

Figure 2:
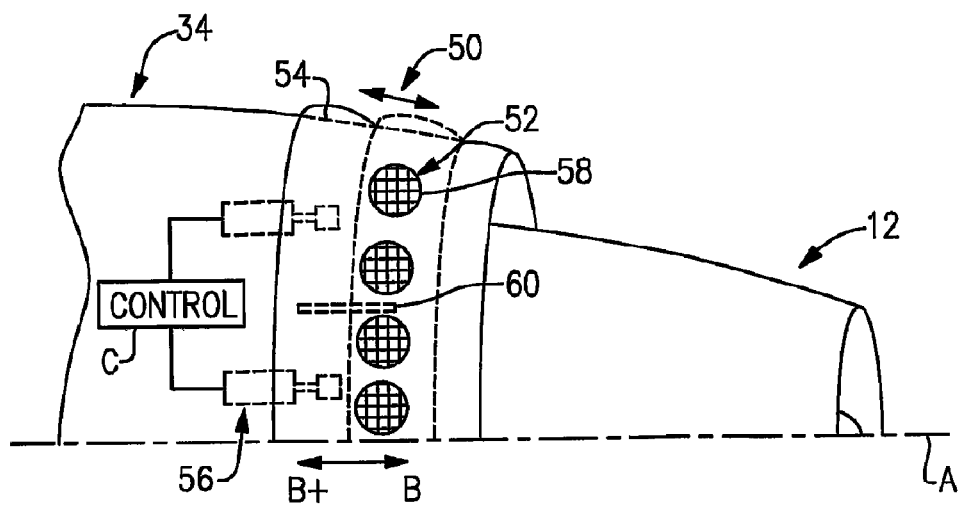
FIG. 2 is a perspective view of an axially operated FVAN.

Referring to FIG. 2, the sleeve system 50 generally includes a multiple of vents 52 and a sleeve 54 axially movable along the engine axis A relative to the vents 52 by an actuator system 56. The sleeve 54 is mounted about the fan nacelle 34 and is movable thereto such as on a longitudinal track system 60 to change the effective area of the fan nozzle exit area 44 and permit efficient operation at predefined pressure ratios. That is, the bypass flow B is effectively altered by opening and closing the additional flow area provided by the vents 52. Seals between the sleeve 54 and the vents 52 prevent leakage. The sleeve system 50 changes the physical area and geometry of the bypass flow path 40 during particular flight conditions. Most preferably, the sleeve is divided into a multiple of sectors (best seen in FIGS. 3B and 4B) to facilitate thrust vectoring operations. Preferably, the sleeve system 50 is closed to define a nominal converged position for the fan nozzle exit area 44 during cruise and is opened for other flight conditions such as landing and takeoff.

The vents 52 are preferably located circumferentially about the fan nacelle 34 within the fan nacelle end segment 34S downstream of the fan section 20. The fan nacelle end segment 34S is preferably located adjacent an aft most end segment of the fan nacelle 34, however, the vents 52 may be located in other segments of the fan nacelle 34. The vents 52 preferably include a grid structure 58 which directs and smoothes the airflow therethrough as well as reduces noise generation by introducing randomness in the flow stream to break the otherwise discrete vertical structures and minimize edge tones therefrom.

In operation, the variable area flow system 50 communicates with the controller C to adjust the sleeve relative the vents 52 to effectively vary the area defined by the fan nozzle exit area 44. Other control systems including an engine controller or an aircraft flight control system may also be usable with the present invention. By adjusting the entire periphery of the FVAN 42 in which all segments are moved simultaneously, engine thrust and fuel economy are maximized during each flight regime by varying the fan nozzle exit area. By separately adjusting the circumferential sectors of the FVAN 42 to provide an asymmetrical fan nozzle exit area 44, engine bypass flow is selectively vectored to provide, for example only, trim balance, thrust controlled maneuvering, enhanced ground operations and short field performance.

Figure 3A:
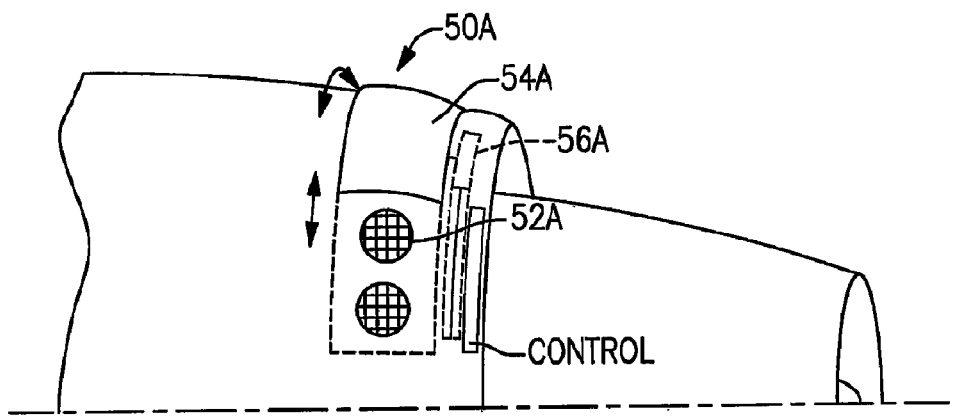
FIG. 3A is a perspective side view of a rotationally operated FVAN.
Figure 3B:
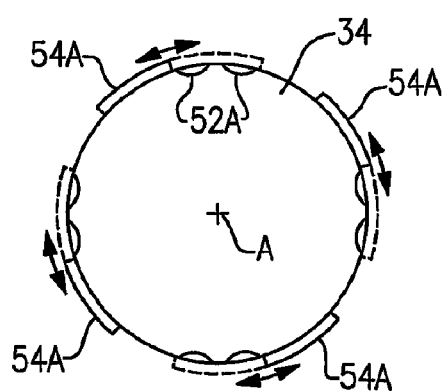
FIG. 3B is a perspective front view of a rotationally operated FVAN.

Referring to FIG. 3A, another embodiment of the sleeve system 50A generally includes a multiple of vents 52A and a sleeve 54A rotatable (FIG. 3B) about the engine axis A such as upon a circumferential track system 60A. The sleeve 54A is mounted about the fan nacelle 34 and is movable thereto to change the effective area of the fan nozzle exit area 44 as generally described above.

Figure 4A:
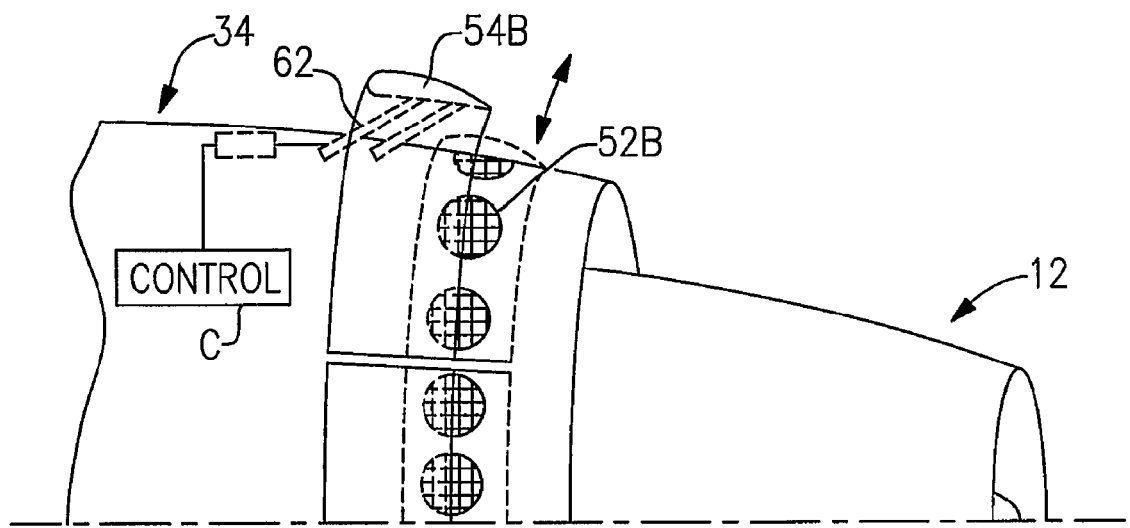
FIG. 4A is a perspective side view of a radially operated FVAN.
Figure 4B:
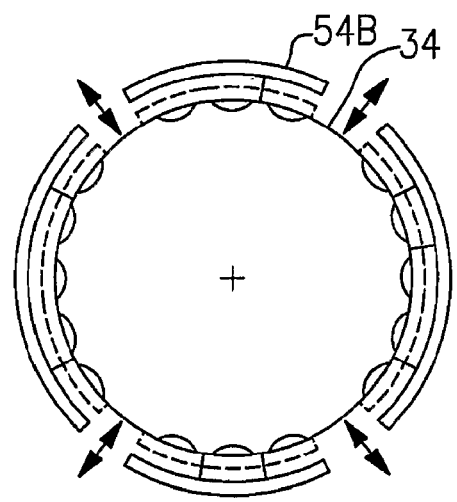
FIG. 4B is a perspective front view of a radially operated FVAN.

Referring to FIG. 4A, another embodiment of the fan variable area system 50B generally includes a multiple of vents 52B and a sleeve 54B which extends and retracts relative the fan nacelle 34 through a linkage 62 such as a scissor or trapezoidal linkage or the like to selectively expose and cover the multiple of vents 52B (also illustrated in FIG. 4B). It should be understood that various actuation, linkage systems, and sleeve movements will be usable with the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a gas turbine engine comprising:
   a core nacelle defined about an axis;
   a fan nacelle mounted at least partially around said core nacelle, said fan nacelle having a multiple of vents within or directly adjacent to an aftmost fan nacelle end segment relative to a direction of flow though the fan nacelle, said multiple of vents in communication with a fan bypass flow; and
   a sleeve movable relative to said multiple of vents and said fan nacelle end segment to vary an effective fan nozzle exit area.

2. The assembly as recited in claim 1, wherein said sleeve is radially movable relative to said axis relative to said vents.

3. The assembly as recited in claim 1, wherein said sleeve is axially movable relative to said vents.

4. The assembly as recited in claim 1, wherein each of said multiple of vents includes a grid therein.

5. The assembly as recited in claim 1, wherein said sleeve is rotationally movable about said axis relative to said vents.

6. The assembly as recited in claim 1, wherein said sleeve is formed from a multiple of sections, each of said sections movable relative to a multiple of vents.

7. The assembly as recited in claim 1, wherein said sleeve is movable adjacent an outer surface of said fan nacelle between a first position and a second position, said first position forward of said multiple of vents.

8. The assembly as recited in claim 1, wherein said sleeve is located about an outer surface of said fan nacelle.

9. The assembly as recited in claim 1, wherein the multiple of vents are entirely aft all fan supporting structures extending from the core nacelle to the fan nacelle.

10. A method of varying an effective fan nozzle exit area of a gas turbine engine comprising the steps of:
    (A) selectively moving a sleeve relative to an aftmost fan nacelle end segment and a multiple of vents within or directly adjacent to the fan nacelle end segment, the multiple vents in communication with a bypass flow to vary a fan nozzle exit area in response to a flight condition, the multiple of vents are entirely aft all fan supporting structures extending from the core nacelle to the fan nacelle.

11. A method as recited in claim 10, wherein said step (A) further comprises:
   (a) at least partially opening the vents to communicate a portion of the bypass flow therethrough to increase the effective fan nozzle exit area in response to a non-cruise flight condition.

12. A method as recited in claim 11, wherein said step (a) further comprises:
   axially sliding the sleeve relative the multiple of vents.

13. A method as recited in claim 11, wherein said step (a) further comprises:
   rotating the sleeve relative the multiple of vents.

14. A method as recited in claim 11, wherein said step (a) further comprises:
   (i) moving the sleeve relative the multiple of vents.

15. The method as recited in claim 10, wherein the fan nacelle end segment is the aftmost fan nacelle end segment relative to a direction of flow though the fan nacelle.

* * * * *

UNITED STATES PATENT AND TRADEMARK OFFICE
CERTIFICATE OF CORRECTION

| | | |
|---|---|---|
| PATENT NO. | : 8,256,225 B2 | Page 1 of 1 |
| APPLICATION NO. | : 12/373752 | |
| DATED | : September 4, 2012 | |
| INVENTOR(S) | : Baltas et al. | |

It is certified that error appears in the above-identified patent and that said Letters Patent is hereby corrected as shown below:

IN THE CLAIMS:

In column 5, claim 12, line 14: insert --(i)-- before "axially"

In column 6, claim 13, line 3: insert --(i)-- before "rotating"

Signed and Sealed this
Twentieth Day of November, 2012

David J. Kappos
*Director of the United States Patent and Trademark Office*